United States Patent [19]

Beauviala

[11] Patent Number: 5,349,411
[45] Date of Patent: Sep. 20, 1994

[54] FILTER AND MATTE BOX SUPPORT SYSTEM

[75] Inventor: Jean-Pierre Beauviala, Grenoble, France

[73] Assignee: Aaton, Grenoble, France

[21] Appl. No.: 821,984

[22] Filed: Jan. 16, 1992

[30] Foreign Application Priority Data

Nov. 28, 1991 [FR] France ................. 91 14717

[51] Int. Cl.$^5$ ..................... G03B 11/00; G03B 17/02
[52] U.S. Cl. ...................................... 354/295; 354/288
[58] Field of Search ............... 354/295, 296, 288, 286, 354/122; 352/34

[56] References Cited

U.S. PATENT DOCUMENTS

| 4,390,242 | 6/1983 | Tatsumi | 354/295 X |
| 4,687,312 | 8/1987 | Navarro | 354/295 |
| 4,752,798 | 6/1988 | Chrosziel | 354/287 |
| 4,901,098 | 2/1990 | Salles | 354/295 |
| 5,040,011 | 8/1991 | Tiffen | 354/295 |
| 5,105,312 | 4/1992 | Tiffen et al. | 354/295 X |
| 5,164,755 | 11/1992 | King | 354/295 |

OTHER PUBLICATIONS

Arri Spare Parts List from Arri Photographic Equipment Manual (particularly pp. 10, 10A, 39-45, 62-66 and 69). No date given (unknown).
Arri Tech.–Information brochure, no date given (unknown).
Alfred Chrosziel Film-Technik GMBH brochure, no date given (unknown).

Primary Examiner—Richard A. Wintercorn
Assistant Examiner—Jae N. Noh
Attorney, Agent, or Firm—Lyon & Lyon

[57] ABSTRACT

A camera system including a matte box assembly for use on cameras for supporting a plurality of filters, the matte box assembly including first and second support arms connected to and supporting separate modules of the matte box such that a rotating filter support module is rotatable independently from the other modules.

19 Claims, 4 Drawing Sheets

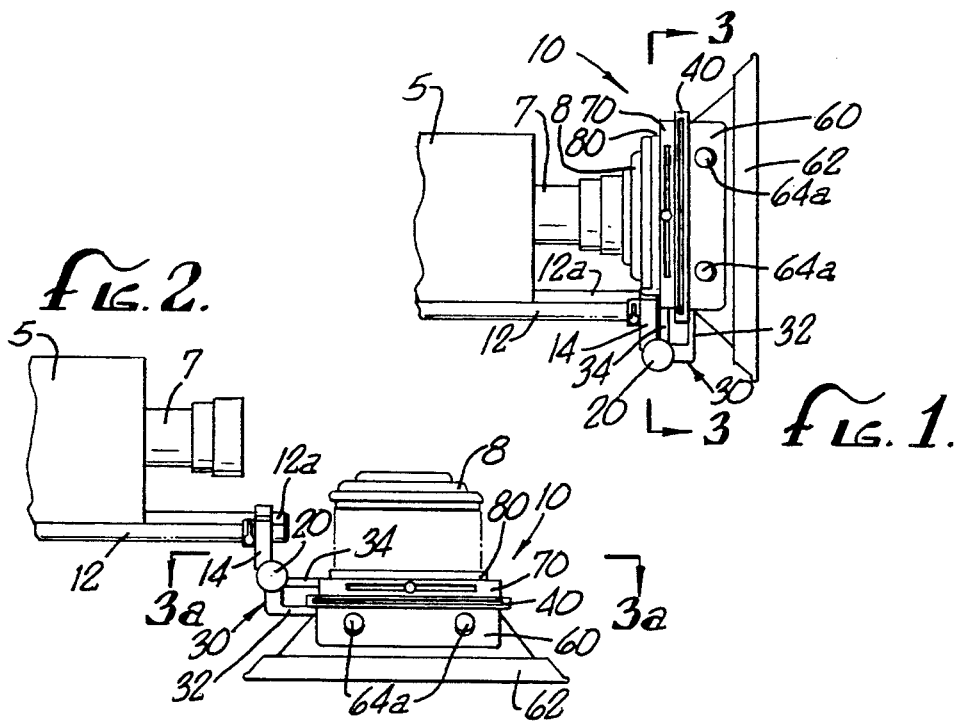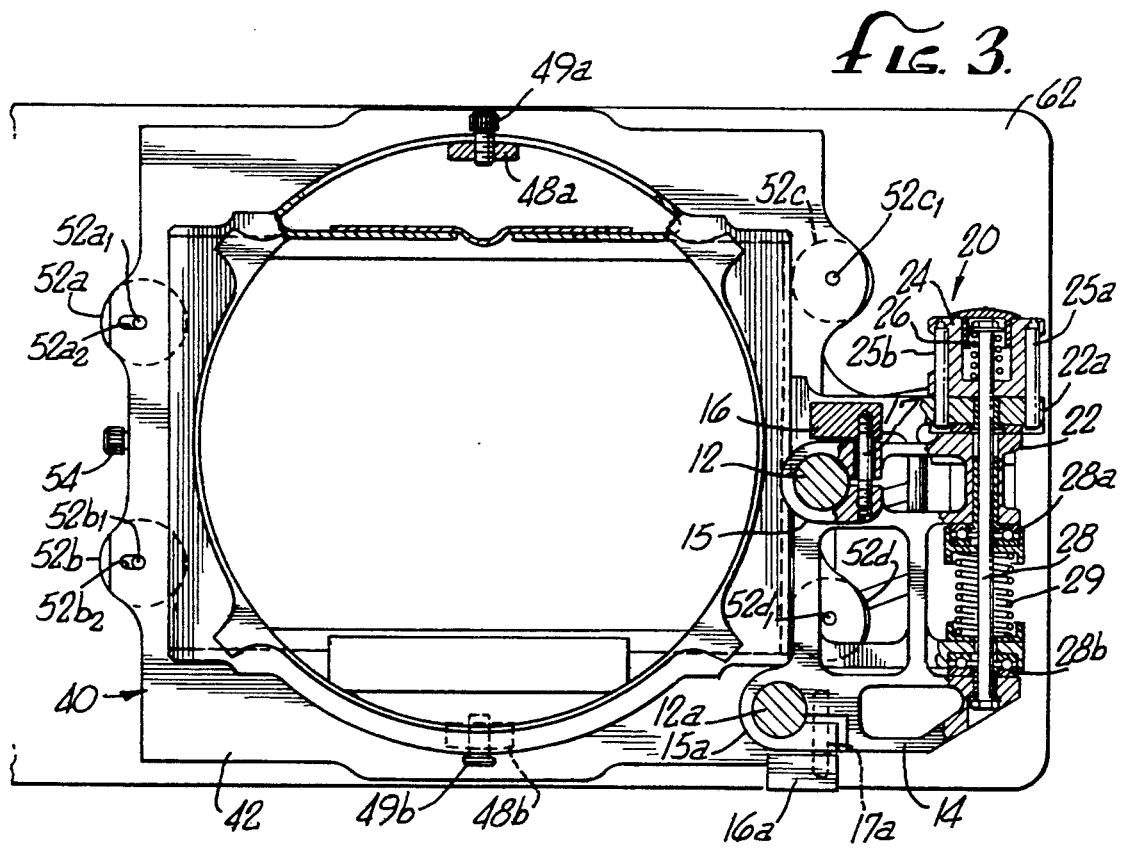

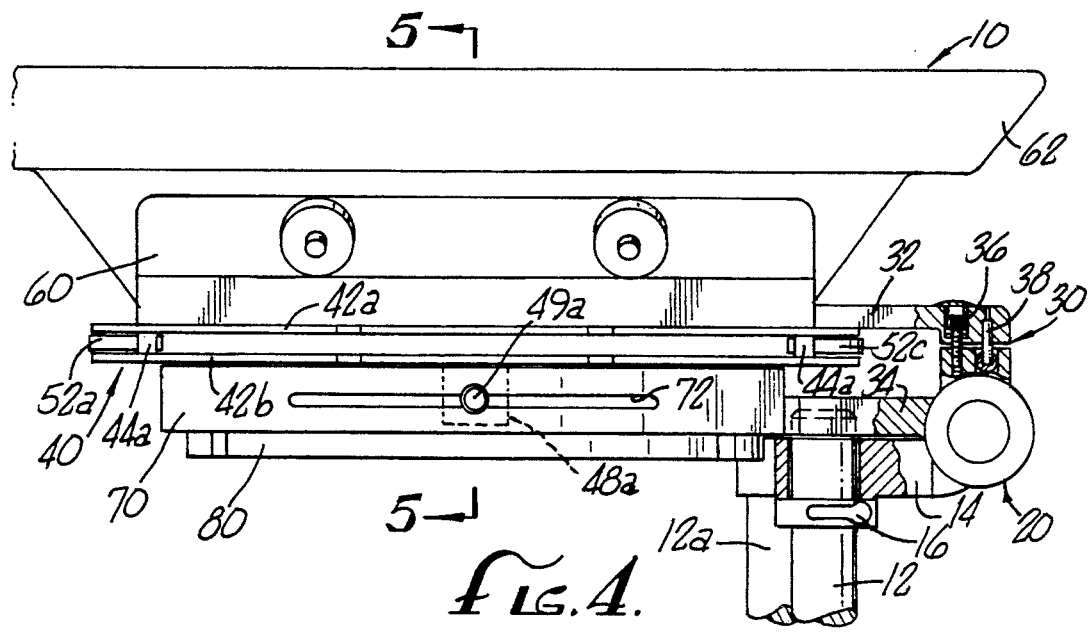
fig.4.
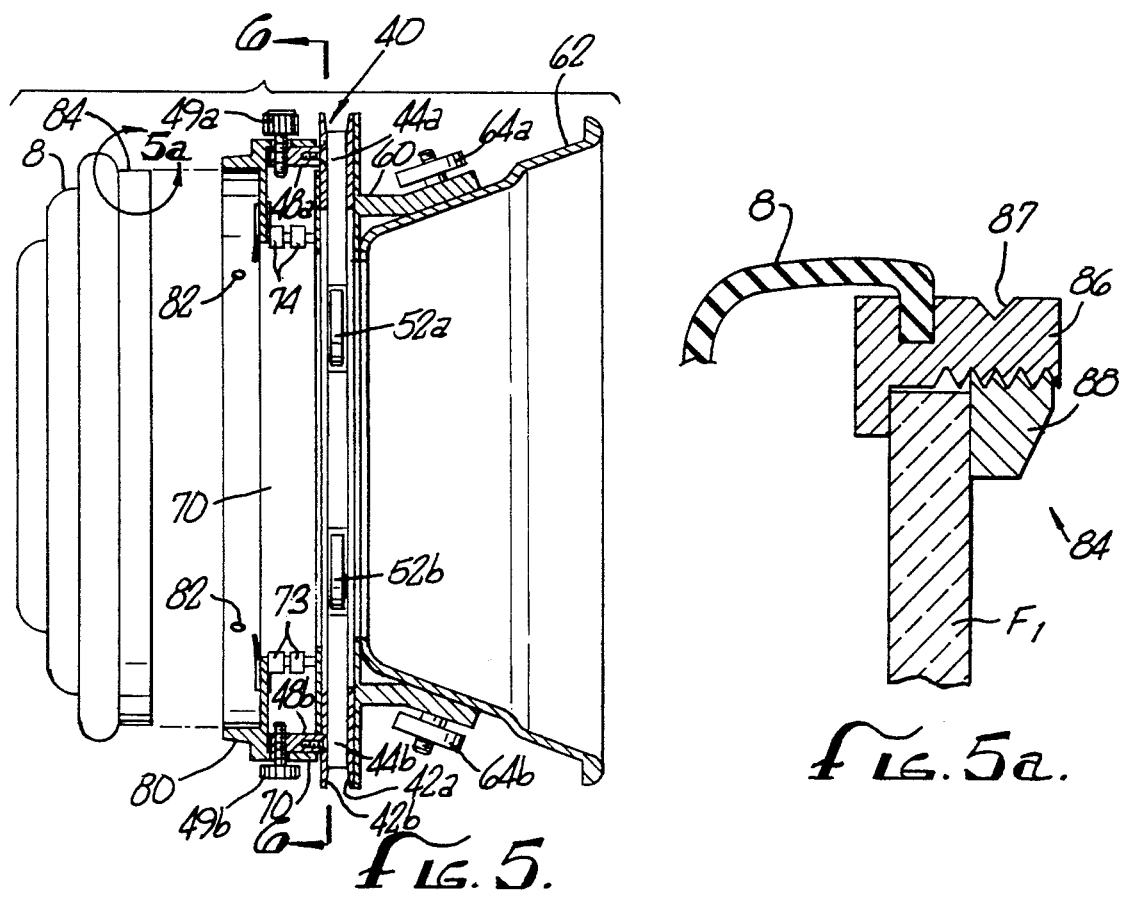
fig.5.
fig.5a.

FILTER AND MATTE BOX SUPPORT SYSTEM

BACKGROUND OF THE INVENTION

The field of the present invention relates to a filter and matte box support system or more simply a matte box assembly for use on a camera and, in particular, for use on professional motion picture or video cameras requiring a variety of different filters to achieve the desired high quality motion picture.

As set forth in U.S. Pat. No. 4,687,312, it is a well known practice in the professional motion picture industry to employ several different types of filters within a so-called matte box in front of the camera lens to produce the high quality of picture or special coloring or other visual effects desired for the motion picture. The filters may be of several different types including various color filters and light polarizing filters. Certain types of filters require rotation about the lens axis to achieve optimum results.

As cameras have been made smaller, it has been desirable for the entire camera system, including the matte box assembly and filters, to also be made smaller. A smaller filter and matte box assembly may result in a smaller, lighter, and less expensive device. Additionally, the closer the filters are to the lens, the smaller the filter may be. Therefore, a thinner or narrower filter holder may desirably place the filter as close as possible to the lens thereby maximizing overall size reduction of the filter and matte box assembly.

Moreover, existing matte box designs have a single point of support with consecutive filter support modules interconnected and supported consecutively to one another whereby rotation of a first filter will also rotate a second filter which is supported by the first filter. When the position of the first filter is adjusted, the second filter must either be readjusted or manually held in place during adjustment of the first filter.

SUMMARY OF THE INVENTION

The present invention relates to an improved camera system including a matte box assembly for use on cameras for supporting a plurality of filters. The matte box assembly includes first and second support arms connected to and supporting separate modules of the matte box such that a rotating filter support module is rotatable independently from the other modules.

BRIEF DESCRIPTION OF THE DRAWINGS

FIG. 1 is a top plan view of the matte box assembly according to the present invention mounted on a camera;

FIG. 2 is a top plan view of the matte box assembly as in FIG. 1 with the front portion of the matte box assembly pivoted to an open position;

FIG. 3 is a cross-sectional view of FIG. 1 taken along line 3—3;

FIG. 4 is a detailed top plan view of the matte box assembly as in FIG. 1;

FIG. 5 is a cross-sectional view of the matte box assembly of FIG. 4 taken along line 5—5;

FIG. 5a is a detailed view of a portion of FIG. 5; and

DETAILED DESCRIPTION OF THE PREFERRED EMBODIMENTS

Figure 3A:
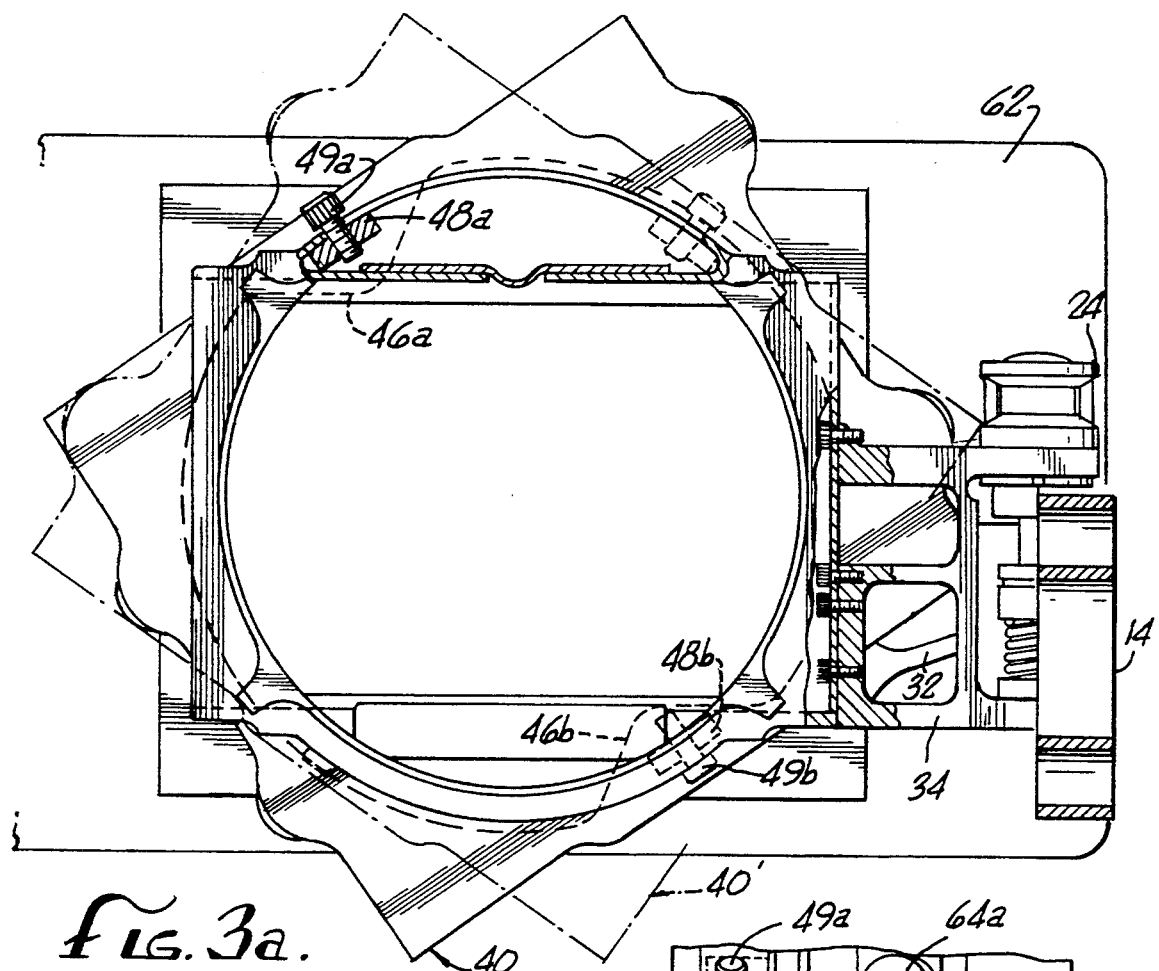
FIG. 3a is a cross-sectional view of FIG. 2 taken along the line 3a–3a and showing alternate positions of the rotatable filter housing.

The preferred embodiment of the present invention will now be described with reference to the drawings. To facilitate the description, a reference numeral representing an element in one figure will represent the same element in any other figure.

FIG. 1 and FIG. 2 are top plan views of a matte box assembly 10 according to a preferred embodiment mounted to a camera 5 in front of a lens 7. FIG. 1 illustrates the matte box assembly 10 with its front portion positioned in the operating condition in front of the lens assembly 7. The matte box assembly 10 includes a hinge assembly 20 which permits rotation of the front portion of the matte box assembly 10 away from the lens assembly 7 as viewed in FIG. 2.

The matte box assembly 10 is supported via a support bracket 14 mounted to the iris rods 12 and 12a. A boot member 8 is interposed between the lens assembly 7 and the rear of the matte box assembly 10 for preventing intrusion of any light between the rear of the matte box assembly 10 and the lens assembly 7.

The matte box assembly 10 includes the support bracket 14, the hinge assembly 20, a U-shaped support structure 30 mounted to the hinge assembly 20, filter modules 40, 70 and 80 supported by the U-shaped support structure 30, and the sunshade frame 60 which is also connected to the U-shaped support structure 30. The sunshade 62 is mounted to the sunshade frame 60 by two mounting bolts 64a, 64a on the top of the sunshade frame 60 and by two mounting bolts 64b, 64b (as shown below in FIG. 5) on the bottom of the sunshade frame 60.

The U-shaped support structure 30 includes a first support arm 32 to which the sunshade frame 60 is mounted and a second support arm 34 to which the primary filter module 70 is mounted. The rotating filter module 40 is rotatably supported between the primary filter module 70 and the sunshade frame 60. The rear filter module 80 is mounted to the rear of the primary filter module 70.

Details of the matte box assembly 10 are set forth in FIGS. 3–6. The stationary support bracket 14 is mounted to the upper and lower iris rods 12 and 12a via clamps 15 and 15a which wrap around the iris rods 12 and 12a respectively. The clamp 15 is secured to the upper iris rod 12 by a locking pin 17 which is rotatable by a handle 16. Similarly the clamp 15a is secured to the lower iris rod 12a by a locking pin 17a tightened down by a handle 16a. The stationary support bracket 14 is integrally connected to the body 22 of the hinge assembly 20.

The hinge assembly 20 includes the body portion 22, head portion 24, a hinge pin 28 mounted between upper and lower bearings 28a and 28b, and a loading spring 29. The head portion 24 includes locking pins 25a and 25b which pass into holes within the upper body portion 22a. The hinge assembly 20 is unlocked by pulling upward on the head portion 24 which moves the locking pins 25a and 25b out of the upper body portion 22a, thereby unlocking the rotational portion of the hinge assembly 20 to which the U-shaped support structure 30 is attached (as best viewed in FIG. 3a). Once the matte box assembly 10 is rotated 90°, the head portion may be released, and the locking pins are urged down into two other corresponding holes in the upper body portion 22a locking the unit in place.

The U-shaped support structure 30 is comprised of a first support arm 32 and a second support arm 34. The first support arm 32 is secured to the second support arm 34 by screws 36, 38. The rotating filter assembly 40 is sandwiched between the sunshade frame 60 and the primary filter module 70. The clearance between the sunshade frame 60 and the primary filter module 70 may be adjusted by the tightness of the screw 36 and the alignment pin 38 and/or by providing suitable spacers such as washers (not shown) around the connecting elements 36, 38 in the joint between the first support arm 32 and the second support arm 34. The connecting elements such as screw 36 may also comprise Belleville washers acting as spring means for urging the first support arm 32 against the second support arm 34.

The embodiment illustrated shows a preferred one-piece construction for the first support arm 32 and the sunshade frame 60. In such a construction, it may be apt to describe the support arm 32 as part of the sunshade support frame 60. Similarly, the second support arm 34 and the body portion 22 of the hinge assembly 20 are preferably formed together in a one-piece construction. Alternatively, the second support arm 34 may also be formed of one-piece construction with the body of the primary filter module 70 though the preferred embodiment shows attachment by screws (see FIG. 3a). These are merely examples of such construction details.

The rotating filter module 40 is constructed from a housing having a front plate 42a and a rear plate 42b attached together and separated by a pair of elongated rectangular spacers 44a, 44a on the top and similarly situated spacers 44b, 44b at the bottom. The front and rear plates 42a and 42b have a generally circular or oval cutout 45 (as best viewed in FIG. 6) which comprises the opening for the entry of light into the lens assembly 7.

The filter F may be inserted into either the top or bottom opening of the rotating filter assembly 40, the edges of the filter F coming into contact with two pairs of opposing rollers 52a & b and 52c & d. The rollers 52a, 52b, 52c and 52d are rotatably mounted on roller pins $52a_1$, $52b_1$, $52c_1$ and $52d_1$, respectively. The rollers 52a and 52b on one side of the rotating filter assembly are axially movable toward or away from the opposing rollers 52c and 52d, each roller 52a, 52b having its respective roller pin $52a_1$, $52b_1$ mounted in its respective elongated slot $52a_2$, $52b_2$.

Figure 6:
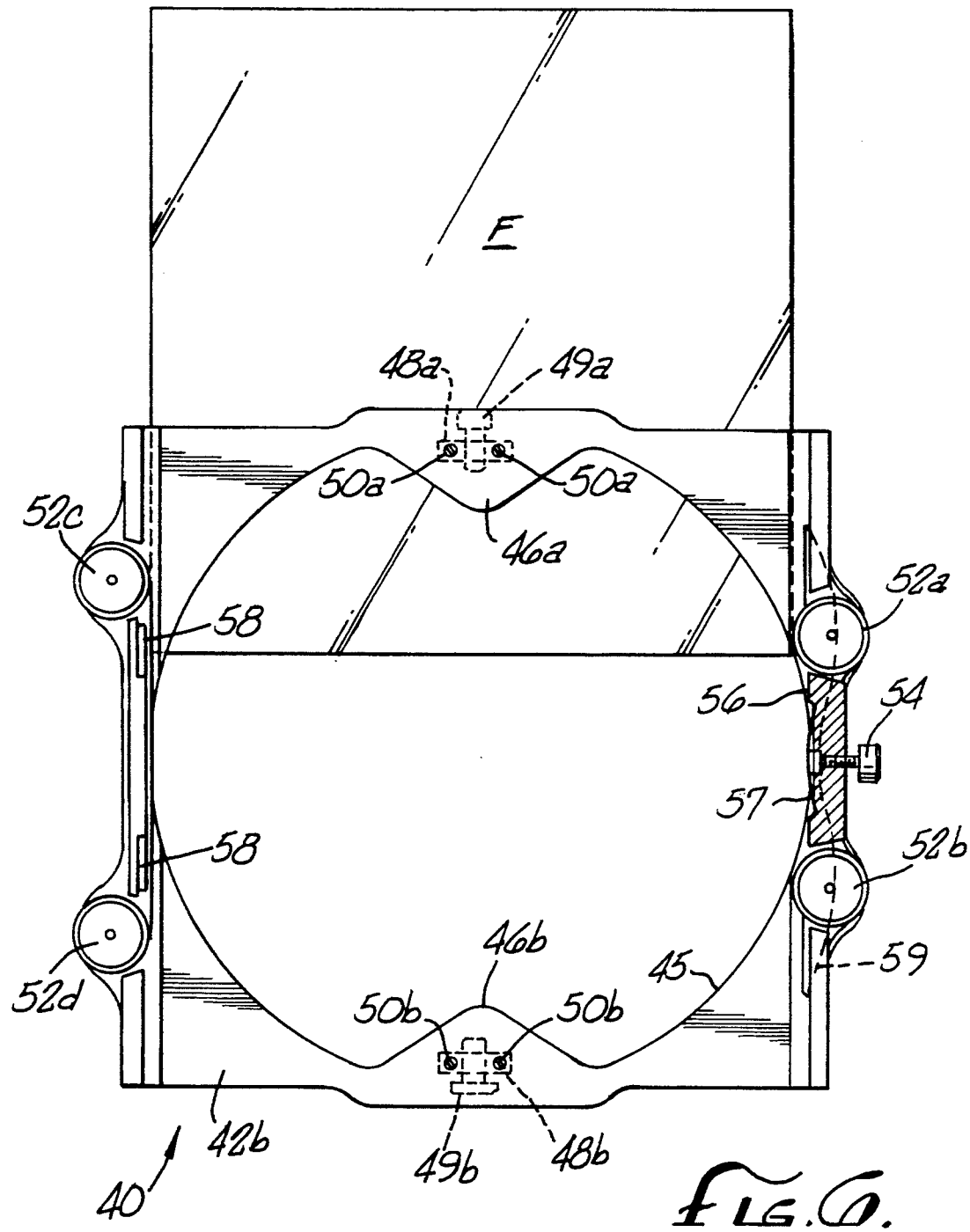
FIG. 6 is a front plan view of the rotatable filter housing in partial cross-section with a filter partially inserted therein.

Each roller 52a and 52b is urged into contact with the filter F by a wire spring 59 (shown in FIG. 6). As the filter F is inserted into the rotatable filter housing 40, the sides of the filter F contact the rollers 52a–d and the vertical position of the filter F may be adjusted by manually rotating the rollers 52a–d from the outside through rolling contact of the surface of the rollers against the edges of the filter F. Once the filter F being inserted into the housing 40 reaches the desired position, it may be locked in place by a locking screw 54 screwed down through a wedge 56 thereby pressing a leaf spring 57 against the edge of the filter F. The filter F is locked between the leaf spring 57 and the rollers 52c and 52d located on the opposite side of the housing 40. Alignment or guide pads 58, 58 are also located on the side of the housing 40 for keeping the filter F in straight alignment.

The cutout 45 in the rotatable filter module 40 has upper and lower extension portions 46a and 46b. Connected to the top extending portion 46a is a rearwardly extending dog or ear 48a secured to the rear plate 42b by screws 50a, 50a. The rearwardly extending dog or ear 48a is illustrated as a rectangular tab member attached to the rear face of the rear plate 42b and extending axially rearward. The tab 48a acts a as cantilever support arms for holding the radial position of the rotatable filter module 40.

The lower extending portion 46b similarly has a rearwardly extending ear 48b secured to the rear plate 42b by screws 50b, 50b. The primary filter module 70 has formed in its outer housing an arcuate slot 72 at the top and bottom thereof. A bolt 49a is placed through the arcuate slot 72 and secured into the ear 48a. Similarly a bolt 49b passes through the slot 72 in the bottom of the primary support module housing and secured within the lower ear 48b. The rotatable filter module 40 is thereby secured to the primary filter module by the bolts 49a and 49b, but is rotatable over a range of the arc of the arcuate slot 72. As viewed in FIG. 3a the rotatable filter module 40 may be rotated in a counterclockwise direction approximately 45° from horizontal and the rotatable filter module 40' illustrated in dotted line is shown to be rotatable clockwise also approximately 45° from horizontal. Rotation of the rotatable filter housing 40 is arrested when the bolts 49a and 49b contact the end of the arcuate slots 72. The bolts 49a and 49b act as alignment elements and/or as rotational stops.

Figure 4A:
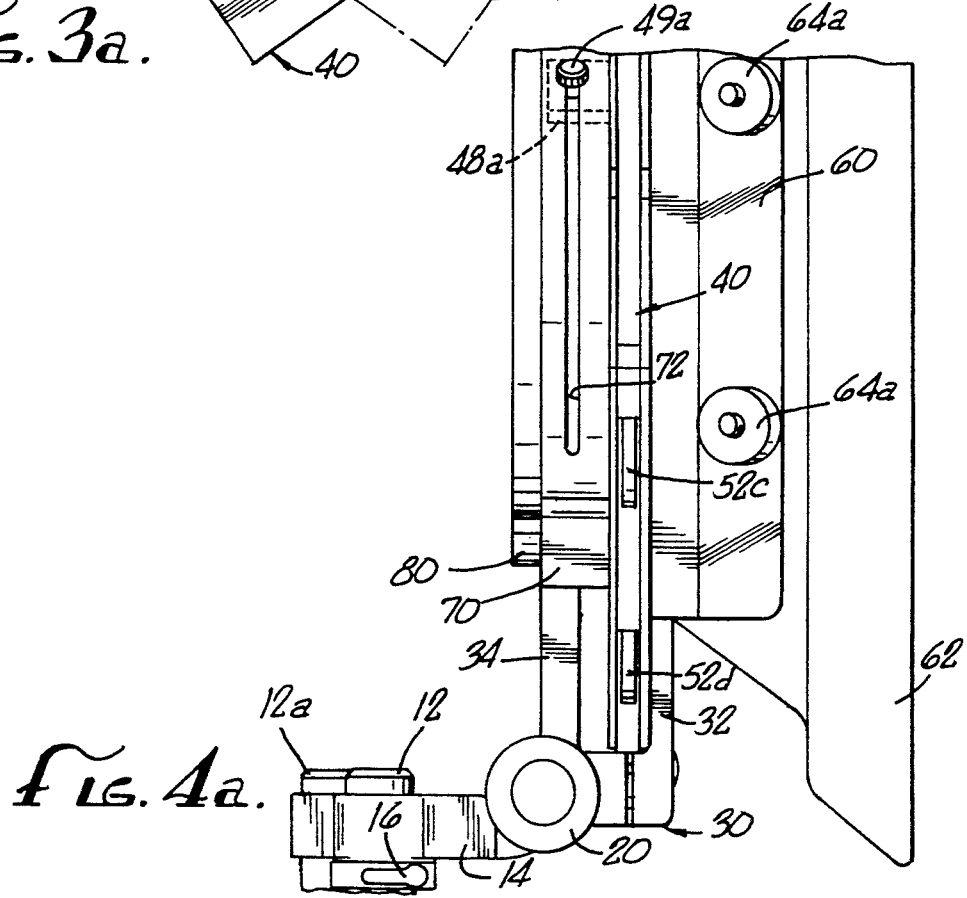
FIG. 4a is a partial top plan view of the matte box assembly as in FIG. 4 with the matte box assembly pivoted to the open position and the rotatable filter housing rotated in one direction.

FIG. 4a illustrates the rotatable filter housing 40 rotated counterclockwise as viewed from the rear with the screw 49a abutting the end of the slot 72. The size of the arcuate slot 72 has been selected to maximize the range of motion of the rotatable filter module 40 which is limited by interference of the corner of the module 40 contacting the interior of the U-shaped support structure 30 (also as viewed in FIG. 4a). The present figures have been drawn to scale and the relative dimensions are selected to minimize the overall size and the thickness of the matte box assembly 10. It is conceivable that the U-shaped support structure 30 could be enlarged, the arcuate slot 72 enlarged to essentially 180° and possibly the corners of the rotatable filter module 40 rounded to permit essentially 180° rotation of the rotatable filter module 40.

It should be noted, however, that the shape of the cutout 45 of the rotatable filter module 40 is such that, as viewed in FIG. 3a, the upper and lower extending portions 46a and 46b do not enter the light path opening even when the rotatable filter module 40 is rotated to the maximum amount. The extending portions 46a and 46b may be reduced in size from that shown so as to not extend past the ears 48a and 48b, thereby avoiding interference with the light path even if the module 40 were rotated 180°.

The primary filter module 70 accepts a rectangular filter insertable from either side thereof. One or two filters may be inserted, one in front of the other, with the filter edges resting against top and bottom friction pads 74, 74 and 73, 73 within the interior of the primary filter module 70.

As shown in FIGS. 5 and 5a, a rear filter module 80 is connected to the primary filter module 70 which accepts a round filter assembly 84. The filter assembly 84 snap fits into spring loaded ball mounts 82 spaced around the interior peripheral surface of the rear filter module 70. The round filter assembly 84 is conventionally constructed of a housing 86 having an outer peripheral groove 87 which engages the ball mounts 82. The filter $F_1$ is secured within the housing 86 by a threaded retaining ring or lock ring 88. The bellows 8 is typically attached to the rear filter assembly housing 86.

The rotatable filter module 40 may also include an extending lip or tongue (not shown) extending and mating in a corresponding groove within the sunshade support bracket 60 or in the primary filter module 70. Such a tongue and groove arrangement would provide additional support for the rotatable filter module 40.

While embodiments and applications of this invention have been shown and described, it would be apparent to those skilled in the art that other modifications are possible without departing from the inventive concepts herein. The invention, therefore, is not to be restricted except in the spirit of the claims that follow.

What is claimed is:

1. A matte box assembly for a camera having a lens and a separate support means for supporting the matte box assembly, comprising
    a stationary support bracket mountable to the separate support means;
    a hinge assembly connected to the stationary support bracket;
    a U-shaped support structure mounted to the hinge assembly, the U-shaped support structure comprised of a first support arm and a second support arm, both arms extending outward from the hinge assembly;
    a sunshade frame mounted to and supported by the first support arm;
    a primary filter module mounted to and supported by the second support arm; and
    a rotating filter support module which includes a filter housing and is rotatably supported by at least one of the primary filter module and the sunshade frame and positioned therebetween, the rotating filter support module being rotatable independently from both the primary filter module and the sunshade frame.

2. A matte box assembly according to claim 1 wherein the first support arm and the sunshade frame are formed together in a one-piece construction.

3. A matte box assembly according to claim 1 further comprising filters associated with respective filter modules.

4. A matte box assembly according to claim 1 wherein the hinge assembly includes a spring loaded releasing mechanism, said hinge assembly providing means for pivoting of the U-shaped support structure toward and away from the stationary support bracket.

5. A matte box assembly according to claim 1 further comprising spring means associated with the U-shaped support structure for urging the first support arm against the second support arm.

6. A matte box assembly according to claim 1 wherein the rotating filter module includes an axially extending tab connected to a side edge thereof and an alignment element disposed on the tab, the alignment element being engaged within an arcuate slot positioned within an outer peripheral surface of the primary filter module.

7. A matte box assembly according to claim 6 wherein the arcuate slot extends over an arc of about 90°, the alignment element and the arcuate slot operating in combination as a stop mechanism for rotation of the rotating filter module.

8. A matte box assembly according to claim 1 wherein the rotating filter support module is rotatably supported via the first support arm and held between the primary filter module and the sunshade frame.

9. A matte box assembly according to claim 1 whereby rotation of the primary filter module does not cause rotation of the rotating filter module.

10. A matte box assembly for a camera having a lens mounted on the camera, comprising
    a U-shaped support bracket including a first support arm and a second support arm;
    a sunshade frame module mounted to and supported by the first support arm;
    a primary filter module mounted to and supported by the second support arm;
    a rotating filter module having a filter housing, said rotating filter module being positioned and rotatably supported between the primary filter module and the sunshade frame module.

11. A matte box assembly for a camera having a lens and a separate support means for supporting the matte box assembly, comprising
    a stationary support bracket mountable to the separate support means;
    a primary support structure supported upon the stationary support structure, the primary support structure including a first support arm and a second support arm;
    a sunshade frame module mounted to and supported by the first support arm;
    a primary filter module mounted to and supported by the second support arm; and
    a rotating filter support module which includes a filter housing and is rotatably supported by at least one of the primary filter module and the sunshade frame module and positioned therebetween, the rotating filter support module being rotatable independently from both the primary filter module and the sunshade frame.

12. A matte box assembly according to claim 11 further comprising a hinge assembly connected on one side thereof to the stationary support bracket with the primary support structure connected on another side thereof.

13. A matte box assembly according to claim 11 wherein the rotating filter support module is rotatably supported via the first support arm and held between the primary filter module and the sunshade frame.

14. A matte box assembly according to claim 11 whereby rotation of the primary filter module does not cause rotation of the rotating filter module.

15. A matte box assembly for a camera having a lens and a separate support means for supporting the matte box assembly, comprising
    a stationary support bracket mountable to the separate support means;
    a hinge assembly connected to the stationary support bracket;
    a primary support structure mounted to the hinge assembly, the primary support structure including a first support arm and a second support arm, both arms extending outward from the hinge assembly;
    a sunshade frame module mounted to and supported by the first support arm;
    a primary filter module mounted to and supported by the second support arm; and a rotating filter support module which includes a filter housing and is rotatably supported by the primary filter module and by the first support arm, wherein the rotating filter support module is positioned between the primary filter module and the sunshade frame module, the rotating filter support module being rotatable independently from both the primary filter module and the sunshade frame module.

16. A matte box assembly according to claim 15 whereby rotation of the primary filter module does not cause rotation of the rotating filter module.

17. A camera system comprising:
a camera;
a lens assembly removably mounted to the camera; and
a matte box assembly positionable in front of the lens assembly and supported by a separate support means, the matte box assembly comprising
a stationary support bracket mountable to the separate support means,
a hinge assembly connected to the stationary support bracket,
a U-shaped support structure mounted to the hinge assembly, the U-shaped support structure comprised of a first support arm and a second support arm, both arms extending outward from the hinge assembly,
a sunshade frame module mounted to and supported by the first support arm,
a primary filter module mounted to and supported by the second support arm, and
a rotating filter support module which includes a filter housing and is rotatably supported by at least one of the primary filter module and the sunshade frame module and positioned therebetween, the rotating filter support module being rotatable independently from both the primary filter module and the sunshade frame module.

18. A camera system according to claim 17 wherein the rotating filter support module is rotatably supported via the first support arm and held between the primary filter module and the sunshade frame.

19. A camera system according to claim 17 wherein whereby rotation of the primary filter module does not cause rotation of the rotating filter module.

* * * * *